(12) United States Patent
Adams et al.

(10) Patent No.: US 8,014,608 B2
(45) Date of Patent: Sep. 6, 2011

(54) WEB-BASED IMAGE EXTRACTION

(75) Inventors: Stephen Paul Adams, Lexington, KY (US); Michael Joseph Dattilo, Lexington, KY (US); Brent Schanding, Winchester, KY (US); Leslie Teryl Snow, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1491 days.

(21) Appl. No.: 11/371,893

(22) Filed: Mar. 9, 2006

(65) Prior Publication Data

US 2007/0211080 A1 Sep. 13, 2007

(51) Int. Cl.
*G06K 9/46* (2006.01)
(52) U.S. Cl. ......................... 382/190; 345/619
(58) Field of Classification Search .................... 382/190
See application file for complete search history.

(56) References Cited

U.S. PATENT DOCUMENTS

| | | | |
|---|---|---|---|
| 6,035,323 A * | 3/2000 | Narayen et al. | 709/201 |
| 6,119,135 A | 9/2000 | Helfman | |
| 6,539,420 B1 | 3/2003 | Fields et al. | |
| 6,690,843 B1 | 2/2004 | Squilla et al. | |
| 6,847,733 B2 | 1/2005 | Savakis et al. | |
| 6,900,905 B2 | 5/2005 | Simpson et al. | |
| 6,931,600 B1 * | 8/2005 | Pittman | 715/767 |
| 6,944,868 B2 | 9/2005 | Simpson et al. | |
| 2001/0056418 A1 | 12/2001 | Youn | |
| 2002/0107847 A1 | 8/2002 | Johnson | |
| 2003/0030837 A1 | 2/2003 | Simpson et al. | |
| 2003/0033432 A1 | 2/2003 | Simpson et al. | |
| 2003/0033445 A1 | 2/2003 | Simpson et al. | |
| 2003/0072025 A1 | 4/2003 | Simpson et al. | |
| 2003/0081241 A1 | 5/2003 | Simpson et al. | |
| 2003/0112460 A1 | 6/2003 | Simpson et al. | |
| 2003/0117651 A1 | 6/2003 | Matraszek et al. | |
| 2005/0007382 A1 | 1/2005 | Schowtka | |
| 2005/0007625 A1 | 1/2005 | Garcia | |
| 2005/0065979 A1 | 3/2005 | Vachovsky | |
| 2005/0210414 A1 | 9/2005 | Angiulo et al. | |

* cited by examiner

*Primary Examiner* — Samir Ahmed
*Assistant Examiner* — Ruiping Li

(57) ABSTRACT

Images may be extracted from a site in a network for further processing, such as storing or printing. The extraction process may change depending on the site type or classification. Sites may be categorized as belonging to one or more predetermined types. Sites may be categorized as belonging to a recognized site list. An image extraction process may be associated with each predetermined type or each recognized site. Upon browsing to a site and initiating the extraction process, the site is identified as belonging to one of the predetermined types or recognized sites. Then, one or more images is extracted from the site using the associated extraction process.

12 Claims, 4 Drawing Sheets

WEB-BASED IMAGE EXTRACTION

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to directed to methods for extraction of images from a site in a network of images for further processing, such as storing or printing.

2. Description of the Related Art

Recent developments in digital photography have changed the landscape of photo handling, storage, and processing. For example, many consumers are using the Internet to share and store digital photos that are acquired on a digital camera, digital scanner, or from the Internet. In many cases, the same web sites that provide storage of digital photos also allow consumers to order hardcopy prints of their digital photos. However, as consumer photo printing devices, including the ink and media used therein, improve in quality and become more cost-effective, consumers may choose to print more of their own photos. Unfortunately, the process of printing photos from a remote photo collection may be cumbersome. Printing each desired photo may require some combination of downloading and printing or "right-clicking" and printing the individual photos and repeating the process for each image.

In addition to a consumer's own photos, the Internet provides a plethora of digital images that are accessible whether by browsing or by image searches. In the former case, conventional web browsing reveals web pages that are usually some combination of objects such as frames, text, and images, including still images, videos, and moving graphics. Sometimes, a user may wish to print a hardcopy of an image that appears on a website, only to determine that image of interest is cropped or missing on the resulting printed page.

Images may also be obtained through a search engine. In some cases, the results of the search appear as an arranged list of thumbnail images that represent a link to a higher resolution version. Users may wish to print some or all of these images. Unfortunately, this may entail browsing to each individual "hit" and downloading and printing or "right-clicking" and printing the individual photos. After each image is obtained, the user may have to return to the search page to browse to another image. Furthermore, the search results may span multiple pages, thus requiring additional steps to reach and obtain the desired images. Each of the different scenarios described requires a rather cumbersome sequence of steps to obtain and/or print the desired images and may not always achieve the desired results.

SUMMARY

Embodiments of the present invention are directed to the extraction of images from a site in a network of images for further processing, such as storing or printing. The extraction process may change depending on the site type or classification. Sites may be categorized as belonging to one or more predetermined types. Alternatively, sites may be categorized as belonging to a recognized site list. An image extraction process may be associated with each predetermined type or each recognized site. Upon browsing to a site and initiating the extraction process, the site is identified as belonging to one of the predetermined types or recognized sites. Then, one or more images can be extracted from the site using the associated extraction process.

In one embodiment, the predetermined type is a photo album site comprising albums of images having links to higher resolution images. In this case, the albums can be identified and the higher resolution images can be extracted from these albums. In another embodiment, the predetermined type is a search site comprising a plurality of pages of links to higher resolution images satisfying a parameter search. In this case, a recursive search technique can be used to extract the higher resolution images from the sequence of search result pages. In one embodiment, the predetermined type is a generic site comprising at least one displayed image that may be a link to a higher resolution duplicate. The displayed image or the higher resolution duplicate image may be extracted if a predetermined condition is met.

DETAILED DESCRIPTION

Figure 1:
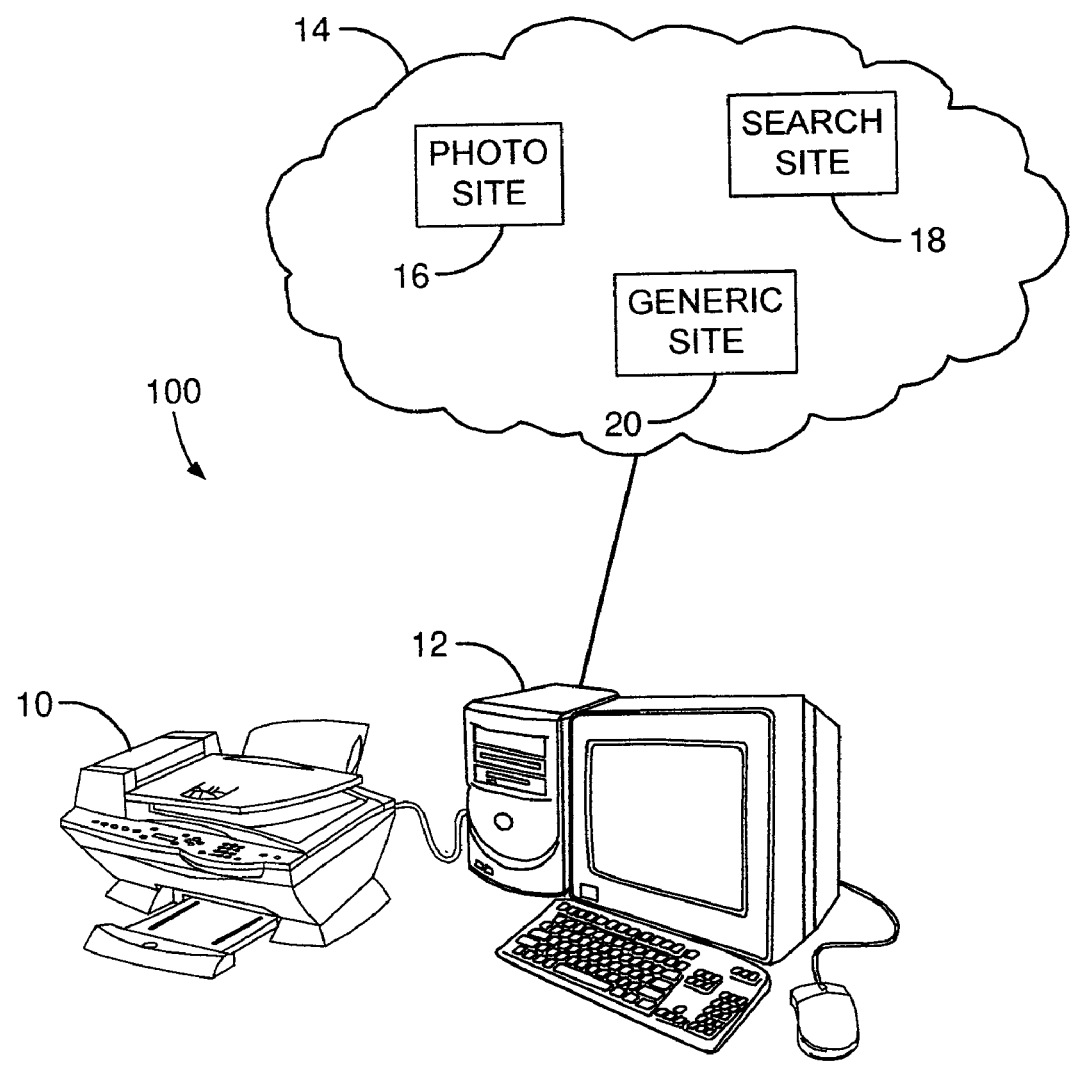
FIG. 1 is a functional block diagram of a computer system on which the image extraction program may be implemented according to one embodiment.

The various embodiments disclosed herein are directed to the extraction of images from a network for subsequent processing, such as printing. FIG. 1 depicts a computing system 100 comprising one embodiment of a representative printer, such as an All-In-One (AIO) device, indicated generally by the numeral 10 and a computer, indicated generally by the numeral 12. A multifunction device 10 is shown, but other image forming devices, including laser printers and ink-jet printers are also contemplated. Similarly, a desktop computer 12 is shown, but other conventional computers, including laptop and handheld computers are also contemplated. The image extraction process may be performed automatically or under the control of a user working on the computer 12. A user may wish to extract the images from a network 14 such as the Internet for further processing. As an example, a user may elect to print photos or images obtained from the network 14 on a printer 10. The printer 10 may be a local printer or a network printer disposed within a local area network or a remote printer disposed within a wide area network.

The various embodiments disclosed herein are further capable of using different image extraction techniques depending on the source from which the images are extracted. The source may be different types of web sites 16, 18, 20 that are accessible over the network 14. The sites 16, 18, 20 illustrated in FIG. 1 represent different types of web sites available over a local network, the Internet, or World Wide Web. For example, site 16 may represent a photo album web site that comprises links representing the contents of one or more image albums. Site 18 may represent a search web site that produces multiple images matching a set of search parameters, such as keywords. Site 20 may represent a generic web site that provides some combination of text, graphics, video, and other information content. In general, the various embodiments of an image extraction program are able to detect and parse a collection of images from a photo album web site 16 or search web site 18. For either type of site 16, 18, the embodiments are able to extract some or all of the highest resolution/quality images that are linked from a displayed page. In other instances, the embodiments are able to detect what is likely the most desirable image at a given generic web page 20. Ultimately, the extracted images are printed, stored, or displayed locally (e.g., on the printer 10 or computer 12) for further processing.

Figure 2:
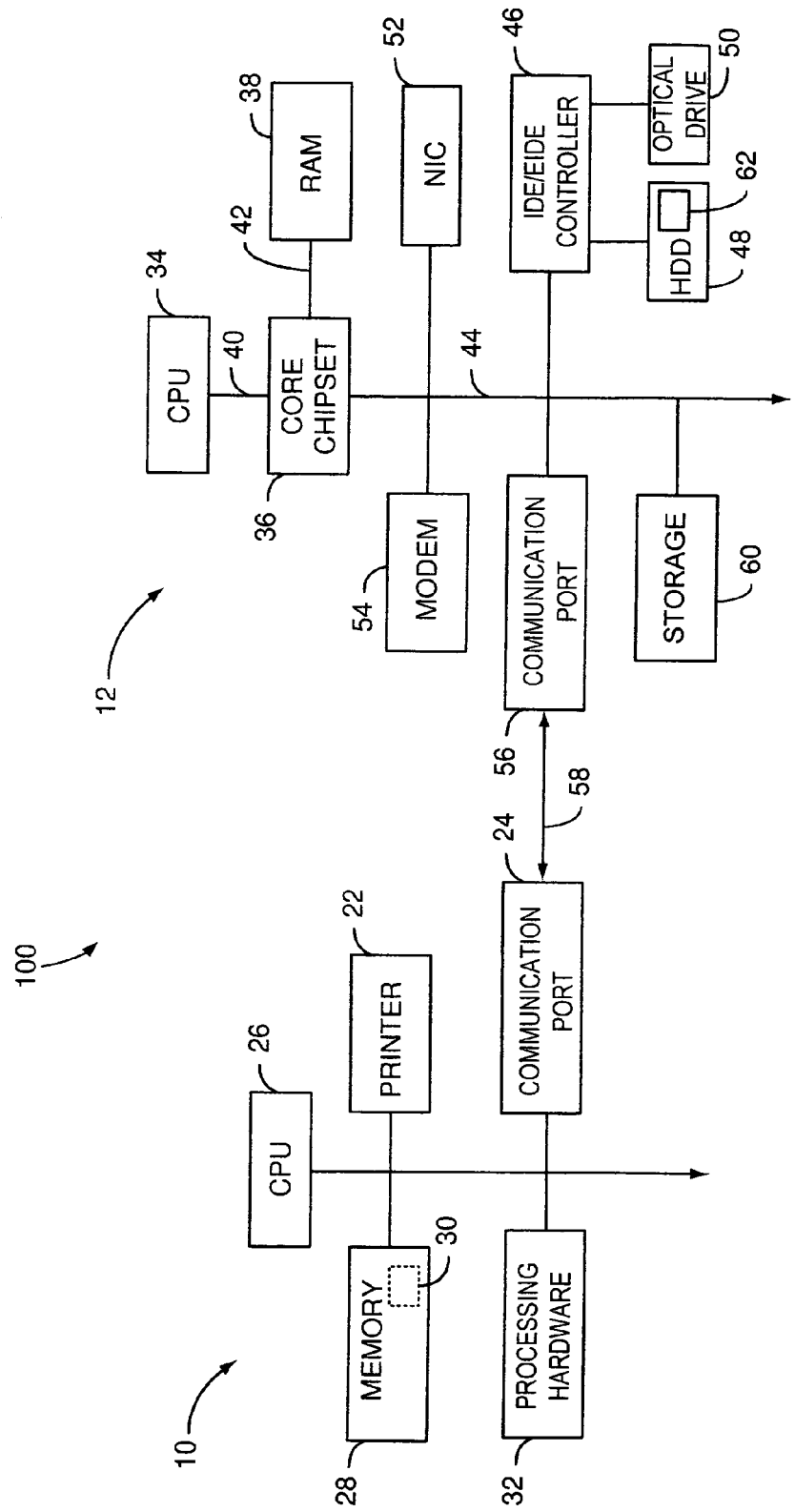
FIG. 2 is block diagram illustrating various functional components of the exemplary computing system from FIG. 1.

With regards to the image extraction techniques disclosed herein, certain embodiments may be performed by a software program that is stored locally and executable on the exemplary printer 10 or computer 12. Accordingly, the relationship between the stored program and the processing components within the printer 10 and the computer 12 is more clearly shown in the functional block diagram provided in FIG. 2. Specifically, FIG. 2 provides a simplified representation of some of the various functional components of the exemplary computing system 100, including the printer 10 and computer 12. For instance, the printer 10 includes an integrated printer engine 22, which may itself include a conventionally known ink jet or laser printer with a suitable document transport mechanism. The printer 10 may also include integrated wired or wireless network interfaces. Therefore, communication port 24 may also represent a network interface, which permits operation of the printer 10 as a stand-alone device not expressly requiring a host computer 12 to perform many of the included functions. A wired communication port 24 may comprise a conventionally known RJ-45 connector for connection to a 10/100 LAN or a 1/10 Gigabit Ethernet network. A wireless communication port 24 may comprise an adapter capable of wireless communications with other devices in a peer mode or with a wireless network in an infrastructure mode. Accordingly, the wireless communication port 24 may comprise an adapter conforming to wireless communication standards such as Bluetooth®, 802.11x, 802.15 or other standards known to those skilled in the art. A wireless communication protocol such as these may obviate the need for a physical cable link between the printer 10 and the host computer 12.

The printer 10 may also include one or more processing circuits 26, system memory 28, which generically encompasses RAM and/or ROM for system operation and code storage as represented by numeral 30. The system memory 28 may suitably comprise a variety of devices known to those skilled in the art such as SDRAM, DDRAM, EEPROM, Flash Memory, and perhaps a fixed hard drive. Those skilled in the art will appreciate and comprehend the advantages and disadvantages of the various memory types for a given application.

Additionally, the printer 10 may include dedicated processing hardware 32, which may be a separate hardware circuit, or may be included as part of other processing hardware. For example, the image extraction techniques may be implemented via stored program instructions for execution by one or more Digital Signal Processors (DSPs), ASICs or other digital processing circuits included in the processing hardware 32. Alternatively, stored program code 30 may be stored in memory 28, with the image extraction techniques described herein executed by some combination of processor 26 and processing hardware 32, which may include programmed logic devices such as PLDs and FPGAs. In general, those skilled in the art will comprehend the various combinations of software, firmware, and hardware that may be used to implement the various embodiments described herein.

FIG. 2 also shows functional components of the exemplary computer 12, which comprises a central processing unit ("CPU") 34, core logic chipset 36, and system random access memory ("RAM") 38. The single CPU block 34 may be implemented as a plurality of CPUs 34 in a symmetric or asymmetric multi-processor configuration. In the exemplary computer 12 shown, the CPU 34 is connected to the core logic chipset 36 through a host bus 40. The system RAM 38 is connected to the core logic chipset 36 through a memory bus 42. Other illustrated components are coupled to the core chipset 36 through a peripheral component bus 44, such as a PCI bus or PCI-X bus. For example, an IDE/EIDE controller 46 is connected to the core logic chipset 36 through the primary PCI bus 44. A hard disk drive ("HDD") 48 and an optical drive 50 are coupled to the IDE/EIDE controller 46. Also connected to the PCI bus 44 are a network interface card ("NIC") 52, such as an Ethernet card, a modem 54, and a communication port 56. A storage device 60, such as a floppy drive, flash USB drive, external hard drive, or storage in a storage area network, may be coupled to the computer 12 as well.

The communication port 56 may include a complementary adapter conforming to the same or similar protocol as communication port 24 on the printer 10. For example, each of the communication ports 24, 56 may be implemented as a USB or IEEE 1394 adapter. As discussed above, a one- or two-way communication link may be established between the computer 12 and the printer 10 or other printing device through a cable interface indicated by line 58 in FIG. 2. Alternatively, the communication port 56 may comprise an adapter conforming to wireless communication standards as described above. Accordingly, the computer 12 and printer 10 may be coupled through a wireless communications link 58.

Relevant to the techniques disclosed herein, images may be extracted from a remote web site that is accessible through a number of portals in the computing system 100 shown. For example, local and remote networks such as the Internet may be accessible through the NIC 52, modem 54, or a wireless communications port 56. Alternatively, a web page representing links to a database of images may be stored on fixed or portable media and accessible from the HDD 48, optical drive 50, storage 60, or accessed from a network by NIC 52 or modem 54. Further, the various embodiments of the image extraction techniques may be implemented in a device driver, browser plug-in, stand alone program, or other software that is stored in memory 38, on HDD 48, on optical discs readable by optical disc drive 50, storage 60, or from a network accessible by NIC 52 or modem 54. Some or the entire image extraction program may be embodied as a microprocessor, including DSP and ASIC devices, executing embedded instructions or high powered logic devices such as VLSI, FPGA, and other CPLD devices. Those skilled in the art of computers and network architectures will comprehend additional structures and methods of implementing the techniques disclosed herein. For purposes of the following discussion, the image extraction program 62 is illustrated as a computer program stored on a local HDD 48 and executable by CPU 34.

In one embodiment, the image extraction program 62 is presented to the user as a browser toolbar button. As used herein, a browser is intended to be a software application that enables a user to display and interact with text, images, and other information typically located on a web page at a website on the Internet or World Wide Web. Some exemplary browser applications known in the art include Internet Explorer, Mozilla Firefox, and Safari. In one embodiment, the image extraction program 62 is presented to the user as an alternate context menu (i.e., right-click) within a browser. In one embodiment, the image extraction program 62 is a stand-alone software application, operating independently of a web browser, and itself capable of browsing websites to extract desired images. In one embodiment, the image extraction program 62 is a web browser plug-in.

Figure 3:
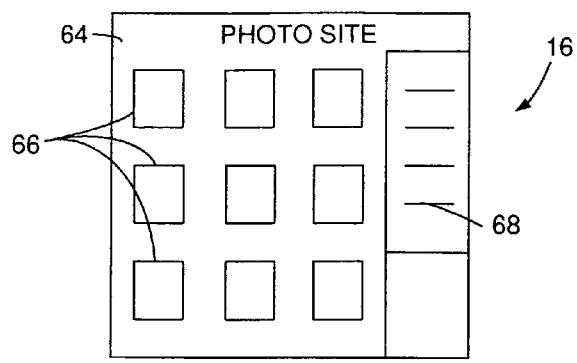
FIGS. 3, 4, and 5 are simplified schematic representations of different types of web sites that may be identified by the image extraction program according to one or more embodiments.
Figure 4:
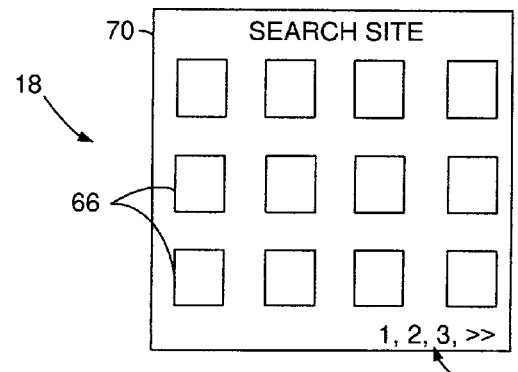
Figure 5:
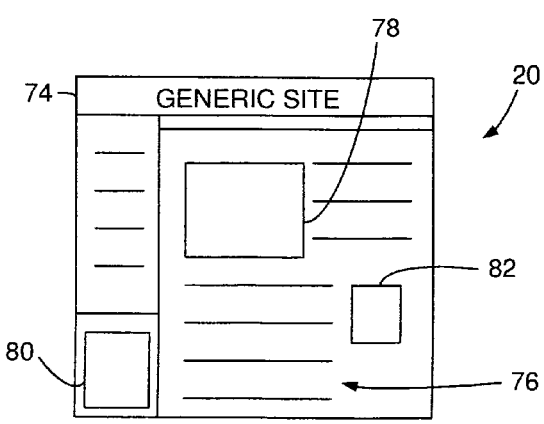

The image extraction program 62 is capable of discriminating between different types of web sites 16, 18, 20 to apply different image extraction steps. FIGS. 3, 4, and 5 illustrate simplified schematic representations of three different types of web sites that may be identified by the image extraction program. In FIG. 3, the illustrated web site 16 is a photo album site. Some commercially available photo album sites 16 that are presently known include Flickr, Snapfish, and Shutterfly. On these types of photo album sites 16, users may perform such tasks as uploading images from a local computer 12, storing the images, organizing the images into albums, sharing the images, and ordering various products such as individual prints, gift cards, and announcements.

FIG. 3 specifically shows a representative page 64 that may be displayed on a photo album site 16. The representative page 64 may include a plurality of thumbnail representations 66 of higher resolution images. The thumbnail representations may provide links to higher resolution versions that are displayed after clicking on the thumbnail representation 66. The representative page 64 may further include an options pane or frame 68 that allows users to perform various tasks such as adding photos, ordering prints, viewing the images as a slideshow, sharing the photos, and editing or deleting photos. If a user wishes to download the high resolution images that are linked to the thumbnail representations 66, the user traditionally clicks on each thumbnail representation 66 to view the higher resolution version. Then, the user saves or prints the displayed image, often by right-clicking the high resolution image and executing the desired task. The user then browses back to the representative page 64 and repeats the process for other images as desired.

FIG. 4 shows a representative page 70 that may be displayed on a search site 18, such as Yahoo, Google, or MSN. The search web site 18 allows users to search the web for image content. Conventionally, keywords for the image search are compared to filenames of images and the results are presented as linking text or thumbnails 66 pointing to the image. The results page 70 may also include text adjacent to the thumbnail image 66. Upon clicking on a thumbnail 66, the higher resolution image and the website on which that image was found is displayed. If a user wishes to download the high resolution images that are linked to the thumbnail representations 66, the user traditionally clicks on each thumbnail representation 66 to view the higher resolution version. Then, the user saves or prints the displayed image, often by right-clicking the high resolution image and executing the desired task. The user then browses back to the representative search result page 70 and repeats the process for other images as desired.

In addition, the search web site 18 may produce multiple pages of "hits" as identified by the page links 72 located towards a bottom side of the search result page 70. The page links 72 may be presented in the form of sequentially increasing page numbers as illustrated. Each number may represent a different page in the multi-page search result. Other embodiments will include "Next" page and "Previous" page designators to navigate through the search results. Other embodiments will use letters and/or letters of a certain color to identify pages of a multi-page search result. In general, each page can be accessed by clicking on a desired page link 72 to access additional search results. Thus, in addition to the thumbnails 66 presented on the illustrated page 70, additional thumbnail links to other images may be found on the additional pages identified by the page links 72.

FIG. 5 illustrates a generic web site 20 that includes a page 74 comprising a combination of text 76 and images 78, 80, 82. Generic web sites 20 may also include other multimedia features, including animated graphics, video, audio, and other content. Other generic web pages 74 may comprise images 78, 80, and 82 alone. Some of the smaller images 82 may include stylistic images such as bullets, bars, logos, or advertisements. These types of images may not be important to a user who prints the page 74. Instead, the user may elect to print the page 74 to obtain a hardcopy reproduction of the larger images 78 or 80, which may be of greater interest to the user. Alternatively, the user may save or print the displayed images 78, 80, often by right-clicking the images 78, 80 and executing the desired task. The user then repeats the process for each desired image.

Figure 6:
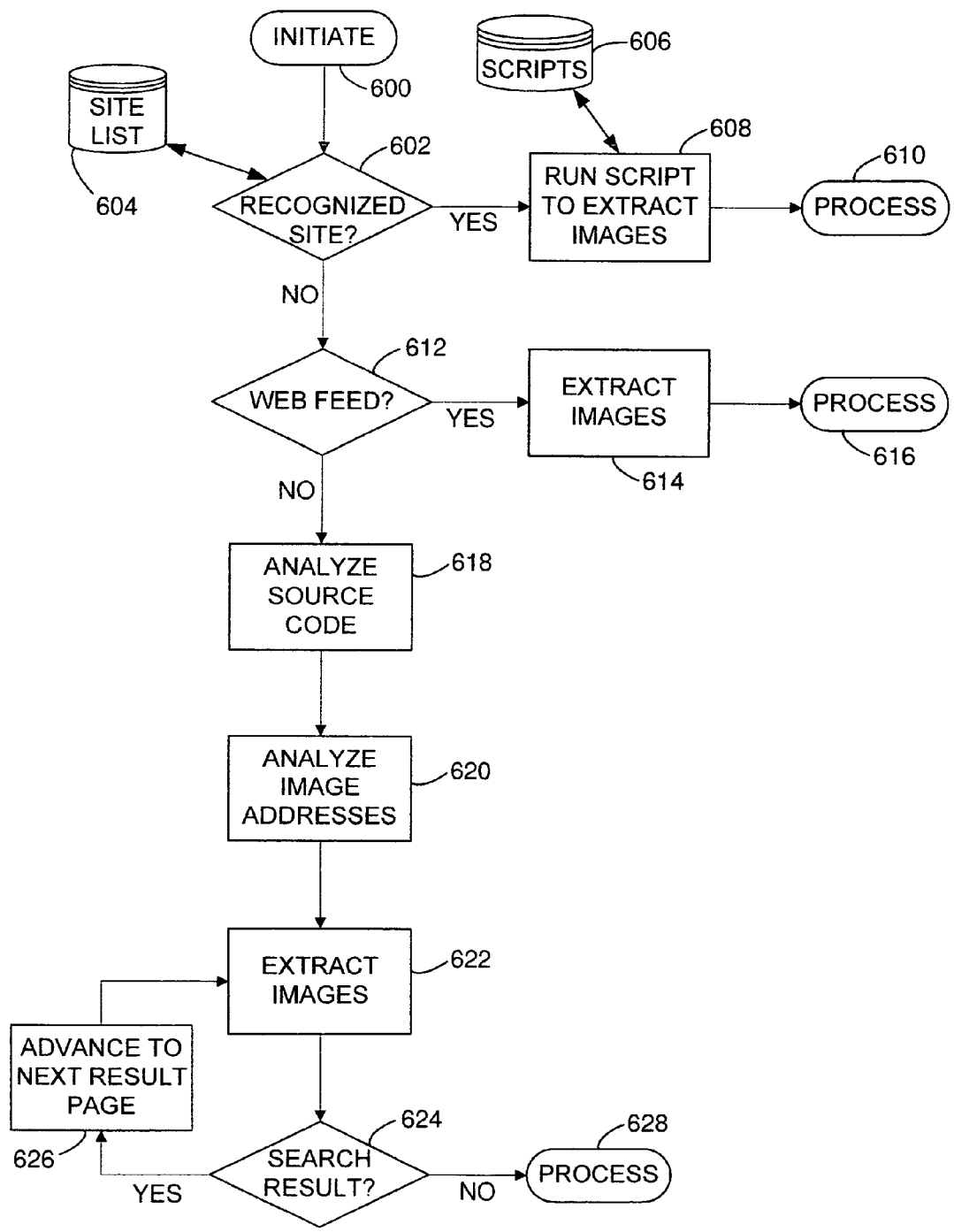
FIG. 6 is a flow diagram illustrating various process steps for extracting images using one or more embodiments of the image extraction program.

The processes described above for obtaining copies of desired images may be cumbersome and may be simplified through the image extraction program 62. An improved process that incorporates the image extraction program 62 and the process steps executed thereby is shown in FIG. 6. As indicated above, the image extraction program 62 may be implemented within a web browser or may operate as a stand alone program having its own user interface. For either type of implementation, a user may initiate the process at step 600 by browsing to the desired web site and initiating the image extraction program 62. As suggested above, the image extraction program 62 may be initiated by clicking on a browser toolbar button. Alternatively, the image extraction program 62 is initiated using an alternate context menu (i.e., right-click) within a browser. Alternatively, the image extraction program 62 is initiated using a predetermined keystroke. Alternatively, the image extraction program 62 is a stand-alone software application having a built-in or automatic initiation button or menu option.

The web site from which the user elects to extract images may be one of the three types 16, 18, 20 described above and shown in FIGS. 3, 4, and 5. In step 602, the image extraction program 62 tests to determine whether the web site is a recognized site. The image extraction program 62 compares the visited site against a predetermined site list 604. The predetermined site list 604 may be populated by a third party or by the user. In one embodiment, a third party, such as a printer manufacturer, may populate and maintain the site list 604 based upon the knowledge that certain sites are visited and printed from more frequently than others. For instance, the exemplary photo album web sites 16 listed above (e.g., Flickr, Snapfish, and Shutterfly) may be included in the list. A plurality of scripts 606 coinciding with this site list 604 are also stored and made available to the image extraction program 62. Generally, each script 606 may correspond to a recognized site 604. Accordingly, each script 606 may be written based upon a known layout or organization of the recognized site 604. That is, the script 606 is constructed with a knowledge of how images are linked and stored on the site 604 so as to extract the images accurately.

In one embodiment, the site list 604 and scripts 606 are stored in a common location though they could be stored in separate locations. In one embodiment, the site list 604 and/or scripts 606 are stored locally on a user's computer 12. In one embodiment, the site list 604 and/or scripts 606 are stored remotely at a server on the Internet that is accessed at a time when the image extraction program 62 is executed to obtain images from the Internet. In one embodiment, the site list 604 and/or scripts 606 are stored locally on a user's computer 12, but updated periodically or on an as-needed basis if more recent versions of the site list 604 and/or scripts 606 are available. The site list 604 and scripts 606 may require periodic updating to capture up-to-date layouts of the recognized sites 604. Various methods of updating the site list 604 and/or scripts 606 at a user's computer 12 are known and may be implemented by those skilled in the art. For instance, the site list 604 and scripts 606 may be pushed to the user's computer 12 from a remote server (not shown). Alternatively, the site list 604 and/or scripts 606 may be pulled down to the user's computer by an update program (not shown) installed on the user's computer 12. Alternatively, the site list 604 and/or scripts 606 may be pulled down to the user's computer by the image extraction program 62. The updates may occur periodically or at predetermined times, such as at startup or upon browsing to a recognized site 604.

Upon reaching a recognized site in step 602, the image extraction program 62 can run the script in step 608 to extract images from the recognized site for further processing in step 610. In one embodiment, the image extraction program 62 extracts high resolution versions of images that are displayed on the screen at the time the script is run. In one embodiment, the image extraction program 62 extracts high resolution versions of images that are within a photo album or other group of images that is displayed on the screen at the time the script is run. In one embodiment, a user may be able to select certain individual images for extraction by the image extraction program. Once the images are located (as directed by the appropriate script 606), the images are downloaded and processed (step 610) through functions such as displaying the images in a new window, storing the images in a predetermined location, or printing at the printer 10. In certain instances, such as where the extracted images are simply displayed or printed, the image data may be cached (i.e., stored in a temporary location or folder) that can be subsequently erased.

If the visited site is not a recognized site, the image extraction program 62 may proceed to step 612. In this step 612, the image extraction program 62 determines whether the visited site contains a web feed, such as RSS feeds, comprising content syndication markup languages such as XML. The web feed is a document that contains image identifiers, possibly including descriptions or titles and web links to a higher resolution image. Similar technology is currently used for weblogs and news websites, but feeds are also used to deliver structured information ranging from weather data to song lists. RSS feeds are one example of a popular format used to disseminate news information. In the context of image distribution, the images may be published and/or syndicated so they are made available as a feed for an information source. As with syndicated print newspaper features or broadcast programs, web feed contents comprising images may be shared and republished by other web sites.

The web feeds may be machine readable, so there is no explicit requirement that they be user-readable. For example, a newspaper or other publication could use web feeds to exchange images with freelance photographers without any human intervention. In other embodiments, the feeds are subscribed to directly by users with a feed reader such as the image extraction program 62. At present, aggregators describe one type of software tool that combines the contents of multiple web feeds for display on a single screen or series of screens. Depending on the software implementation, a subscription is completed by manually entering the address (e.g., URL) of a feed, by clicking link in a web browser to a feed, or by various other methods.

The image extraction program 62 may be configured similar to an aggregator. As such, the image extraction program 62 may reduce the time and effort needed to regularly check websites of interest for updates to image content. The image extraction program 62 may be used to subscribe to a feed, check for new content at user-determined intervals, and retrieve the images. This is represented at step 614, where the image extraction program 62 performs process steps in accordance with local program files and libraries as well as scripts downloaded from the visited site or from the subscribed sites. The scripts may be a content syndication language and may be a markup language, including XML. The content syndication language may be the same or similar to conventional content syndication languages such as RSS or Atom. Once the desired images are extracted, they may be cached or otherwise processed at step 616 through functions such as displaying the images in a new window, storing the images in a predetermined location, or printing at the printer 10. Other processing functions, such as those indicated above, may be used.

If the visited site does not contain a web feed as determined in step 612, the image extraction program 62 proceeds to step 618 to analyze the source code that defines the page formatting and content. In one embodiment, the image extraction program 62 analyzes the source code, which may be presented as HTML, JAVA, or other browser recognizable code, to identify addresses or URL's of links to images on the page. Different approaches may be used to link images that are displayed on a web page. In one approach, the image location is explicitly referenced in the source code. For instance, the image extraction program 62 may look at <a> link tags within the source code. If the link tag includes an <img> tag embedded therein, the image name and location is identified. As a non-limiting example, the link tag may appear as follows:

<a href="myphoto.jpg"><img src="webalbumphoto.jpg"></a> where webalbumphoto.jpg represents the name of the source image that is displayed. The directory location may be included within the quotation marks or may be implied from other commands within the source code. The image extraction program 62 uses this information to build a list of candidate image addresses.

Web pages often use javascript redirection commands to display images. One common approach uses an "OnClick" event in an <img> tag. There may be additional javascript within the event or the event may represent a function call. For either case, the image extraction program 62 follows the link to identify javascript redirections. Some exemplary redirection codes that are used include window.navigate, window.open, and window.location.href=. The image extraction program 62 can identify and store an absolute image location for paths used with these redirections. As before, the image extraction program 62 may build a list of candidate image addresses.

Once the image addresses are determined in step 618, the image extraction program 62 proceeds to step 620 to analyze the images and determine if there are any indications that the web page is part of a photo album web site 16. Different approaches may be implemented to find groupings that are commonly used in photo album web sites 16. One option assumes that the pages of the photo album web site 16 are dynamically generated using a server side language such as active server pages (ASP), hypertext preprocessor pages (PHP), or JavaServer pages (JSP). In these cases, the image address links will be similar to each other with the exception of variables in a query string. An exemplary query string may appear as follows:

http://www.photoalbumsite.com/albums/
query.jsp?var1=value1&var2=value2 where items following the '?' symbol represent search string variables. The image extraction program 62 may compare image addresses with or without the variables to identify album pages that can be searched for images. Image addresses on the root domain for the current site may be ignored as these links generally take a user back to the home page for the web site. Similarly, links to external sites may be ignored or treated as advertisement links since the images of interest are likely stored on servers identified by the same or similar addresses. Upon analyzing the image addresses, the largest common sets of album pages are treated as album pages that may be searched for images.

Another option for analyzing image addresses in step 620 assumes that the image addresses are static and that the image locations remain constant. In this case, images addresses may be similar to one another except for minor changes in the directory or location structure. Exemplary image addresses appear as follows:

http://www.photoalbumsite.com/photos/5894742@N00/
set-98769/img1.jpg and http://www.photoalbumsite.com/photos/5894742@N00/
set-98775/img1.jpg where the difference in image locations is identified by set numbers 98769 versus 98775. The differences may be located towards an end, middle, or beginning of an image address. However, the lengths of the addresses are generally similar. Thus, the image extraction program 62 may search the candidate image addresses for similar lengths and process the number of characters that are different within these addresses. Web album pages may be identified as those pages having a similar length and having relatively few character differences between them. Adjustable or predetermined parameters may be used to define these differences. For example, the lengths of the image addresses may differ by some first predetermined number such as 2, 3, or 4 characters. Smaller or larger numbers may be used as desired. Some number of image addresses in the photo album web site 16 will have lengths within a range defined by this predetermined number. Others falling out of this range may be excluded.

Similarly, another second predetermined number may be used to limit the difference in characters for addresses satisfying the first predetermined parameter. Again, the number of different characters may be limited to less than 5 or 10 characters. Smaller or larger numbers may be used as desired. Thus, image addresses having a similar length, but that vary substantially from album images may be excluded. Once these first and second filtering parameters are applied, the remaining set may reveal web album pages that may be searched for images.

At this point, the image extraction program 62 has identified addresses for images believed to be images of a photo album web site 16. Note that if the current web page is not part of a photo album web site 16 as determined in step 620, the image extraction program 62 still retains the image addresses and treats the page as a generic page 20. Another option is that the image extraction program 62 has identified the current page as part of a search result page on a search site 18. This situation is handled slightly different as will be discussed below. For either scenario, the image extraction program 62 follows the image addresses and retrieves the larger resolution image or images in step 622. Several techniques may be used to retrieve the images. In one embodiment where the image address indicates an actual image (identified by a suffix ending in a known image extension such as .jpg, .gif, .tif, etc. . . . ), the image extraction program 62 extracts the image. In other embodiments, the image addresses represent album pages and the image extraction program 62 browses to the page locations and extracts all images within that album page.

In one embodiment, the image extraction program 62 extracts one or more desirable images from a generic web page 20 based on the premise that the images a user wants to print are larger than other images on the page. Initially, the image extraction program 62 identifies images on the page using <img> tags embedded in the page source code as described above. Then the image extraction program 62 records actual sizes of the images as well as the display sizes. The display sizes may be determined from the source page code and may be represented in pixels or in spatial sizes (i.e., inches or cm as determined by the users monitor display settings). Then, the image sizes are compared against one another, against a threshold value, or some combination thereof. In certain cases, a simple conversion between spatial and pixel sizes may be necessary and may be performed with a knowledge of the browser or monitor display resolution settings (e.g., DPI).

In one embodiment, the user wishes to extract a single, defining image that is much larger than the others. In this case, only the largest image is presented to the user with an option to further process the image (e.g., print or save). In other cases, images exceeding a certain size threshold may be presented to the user. The threshold values may be adjusted so that nearly all images in a page (including buttons, lines, and other page design images) are presented to the user. The user may then select which of the images to process.

As indicated above, the current page may be a search result page on a search web site 18. This may be verified during step 618 by analyzing the source code for the current page and identifying page links 72 (as shown in FIG. 4). The image extraction program 72 identifies the page links as sequential numbers or other identifiers (e.g., words, symbols, images) that lead to similar pages with different variables in the query string. For instance, the following exemplary page links may be found in the source code for the current page:

<a href=/images?q=subject&start=20><img src=/page.gif><br>2</a> and

<a href=/images?q=subject&start=40><img src=/page.gif><br>3</a> where the numbers "2" and "3" within each string identify a page in the search result. The "start" variable may also provide an indication of the "hit" number range that is displayed on a given result page. Using this information, the image extraction program 62 can identify the current page as one of a plurality of search result pages. Thus, in addition to retrieving images for the current search result page in step 622, the image extraction program may loop back to retrieve additional images from other search result pages (identified by YES path from decision step 624). If a search page is detected, the extraction algorithm may also store the subject of the search string to later identify relevant image names. However, in certain cases, the desired image location forms a part of the thumbnail link address.

At this point, if the current page is part of a search result page, the image extraction program 62 advances in step 626 to the next result page and retrieves the images (step 622) for that next page. If the desired images are extracted and/or the current page is not a result page, the images may be cached or otherwise processed at step 628 through functions such as displaying the images in a new window, storing the images in a predetermined location, or printing at the printer 10. Other processing functions, such as those indicated above, may be used.

Given that this iterative process may result in large numbers of images being downloaded, an interrupt may be implemented in decision step 624 or otherwise. For instance, the image extraction program 62 may include a counter to limit the amount of time, images, pages, or download volume for the image retrieval. For instance, a user may limit the process to 5 minutes, or 50 images, 5 search result pages, or 50 MB of image data. Alternatively, the image extraction program 62 may proceed uninterrupted until the user issues a stop command, which may be presented as a browser toolbar button, a pop-up window button, a keystroke or a menu selection. The image extraction program may also provide a countdown or progress indicator. Suitable examples may include a pop up window, a status bar, a scrolling ticker, and a number indicator. In one or more embodiments, the progress indicator may include a thumbnail representation of previous, current, or future images that are downloaded by the image extraction program 62.

While the embodiments disclosed herein may be used in whole, various aspects may be used in part within the image extraction program 62. For instance, the image extraction program 62 may have certain recognized sites enabled by default. Users may enable image extraction for other sites if desired. The generic approach discussed above may be used for the current page, regardless of the type of page. Furthermore, certain popular search pages may be classified as recognized sites. Other implementations are certainly possible.

The present invention may be carried out in other specific ways than those herein set forth without departing from the scope and essential characteristics of the invention. For example, while embodiments described above have contemplated a program that is executable on a computer 12 at which a user wishes to process images. In other embodiments, the image extraction techniques may be implemented partly or completely at remote locations on other machines, such as at the printer 10 on which the images are printed or at the web server from which the images are obtained. In other embodiments, the image extraction techniques and image extraction program 62 may be implemented partly or completely at on servers in a local or wide area network. The present embodiments are, therefore, to be considered in all respects as illustrative and not restrictive, and all changes coming within the meaning and equivalency range of the appended claims are intended to be embraced therein.

What is claimed is:

1. A method of extracting images from a site in a network as candidates for further processing, comprising:
    categorizing sites as belonging to one or more predetermined types, the one or more predetermined types being a photo album site comprising albums of thumbnail images providing links to higher resolution images;
    associating an image extraction process for each predetermined type;
    identifying the site as belonging to one of the predetermined types;
    extracting an image from the site using the extraction process associated with the identified predetermined type; and
    identifying album pages from the photo album site, the identifying the album pages including identifying addresses having lengths within a first predetermined range of one another and having a number of common characters, with a second predetermined range of one another,
    wherein at least one of the categorizing, the associating, the identifying the site, the extracting and the identifying the album pages is performed by a processor.

2. The method of claim 1 wherein the extracting the image from the site comprises extracting one or more of the higher resolution images.

3. A method of extracting images from a site in a network as candidates for further processing, comprising:
    categorizing sites as belonging to one or more predetermined types;
    associating an image extraction process for each predetermined type;
    identifying the site as belonging to one of the predetermined types; and
    extracting an image from the site using the extraction process associated with the identified predetermined type,
    wherein the predetermined type is a generic site comprising a first displayed image, the step of extracting the image from the site comprises extracting the first displayed image if the first displayed image satisfies a predetermined condition and wherein at least one of the categorizing, the associating, the identifying, and the extracting is performed by a processor.

4. The method of claim 3 wherein the predetermined condition is where the first displayed image is the largest image on the generic site.

5. The method of claim 3 wherein the predetermined condition is where the first displayed image is larger than a predetermined size.

6. The method of claim 5 wherein the predetermined size is adjustable.

7. The method of claim 1 wherein the predetermined types comprises sites that are contained within a stored list of recognized sites.

8. A non-transitory computer readable medium which stores computer-executable process steps for extracting images from a site in a network as candidates for further processing, said computer-executable process steps causing a computer to perform the steps of:
    recognizing sites as belonging to one or more predetermined types;
    accessing an image extraction algorithm for each predetermined type;
    identifying the site as belonging to one of the predetermined types;
    extracting an image from the site using the extraction algorithm associated with the identified predetermined type; and
    identifying album pages from a photo album site comprising albums of thumbnail images having links to duplicate higher resolution images,
    wherein the identifying album pages from a photo album site includes identifying addresses having lengths within a first predetermined range of one another and having a number of common characters within a second predetermined range of one another.

9. The computer readable medium of claim 8, further comprising providing a browser toolbar button for initiating the process steps for extracting images.

10. The computer readable medium of claim 8, further comprising providing a stand-alone application for initiating the process steps for extracting images.

11. The computer readable medium of claim 8, wherein the step of extracting the image from the site comprises extracting the higher resolution images from the identified album pages.

12. The computer readable medium of claim 8 wherein one of the predetermined types comprises sites that are contained within a stored list of recognized sites.

* * * * *